United States Patent [19]

Ikefuji et al.

[11] Patent Number: 4,628,249
[45] Date of Patent: Dec. 9, 1986

[54] POWER SUPPLY HAVING A PREDETERMINED VALUE OF INPUT IMPEDANCE

[75] Inventors: Yoshihiro Ikefuji; Mitsuru Koiwa, both of Kyoto, Japan

[73] Assignee: Rohn Company Limited, Kyoto, Japan

[21] Appl. No.: 630,491

[22] Filed: Jul. 13, 1984

[30] Foreign Application Priority Data

Jul. 18, 1983 [JP] Japan ................. 58-131176

[51] Int. Cl.$^4$ .................................. G05F 3/20
[52] U.S. Cl. ........................ 323/315; 323/224; 323/316; 330/288
[58] Field of Search ............. 323/312, 315, 316, 317, 323/223, 224, 225, 226; 330/257, 288, 296, 297; 179/70, 77

[56] References Cited

U.S. PATENT DOCUMENTS

| | | | |
|---|---|---|---|
| 4,019,121 | 4/1977 | Feindt ............................. | 323/315 |
| 4,185,236 | 1/1980 | Van De Plassche et al. ... | 323/317 X |
| 4,330,744 | 5/1982 | Embree et al. ................ | 323/316 |
| 4,513,178 | 4/1985 | Hing et al. .................... | 179/81 R |
| 4,528,496 | 7/1985 | Naokawa et al. .............. | 323/315 |

*Primary Examiner*—Philip H. Leung
*Attorney, Agent, or Firm*—Flynn, Thiel, Boutell & Tanis

[57] ABSTRACT

This disclosure dipicts a circuit for power supply comprising: a first constant-output-current circuit (16) for generating a constant-current-output in response to a non-inverted output current from a comparator (4) for comparing an input signal voltage with a reference voltage; and a second constant-output-current circuit (18) for flowing a superfluous current to a lower potential side in response to an inverted output current from the comparator (4), the second constant-output-current circuit (18) including a plurality of NPN type transistors.

1 Claim, 8 Drawing Figures

POWER SUPPLY HAVING A PREDETERMINED VALUE OF INPUT IMPEDANCE

BACKGROUND OF THE INVENTION

1. Field of the Invention

This invention relates to circuits for power supply, and more particularly to a circuit suitable for use in power supply for a telephone set and the like to which a direct current (DC) voltage having superposed thereon alternating current (AC) signals is given.

2. Description of the Prior Art

In general, delivered to a telephone set through a telephone line from a central telephone exchange is an input having superposed thereon AC signals such as voices, etc., and moreover, the input signal voltages depend upon the value of distance between the central telephone exchange and the telephone set. For this reason, when various electronic circuits of the telephone set are composed of semiconductive integrated circuits (IC), it is necessary to stabilize a driving input delivered to the IC in order to drive the IC reliably.

In the same manner as other electronic circuits, a circuit for power supply for delivering a driving input to the IC may be composed of the IC. However, normally, a P type semiconductive substrate is used in the IC. Hence, in order to form PNP type transistors in the substrate, lateral PNP type transistors should be used. In this case, a wafer area of the IC having mounted therein with the circuit for power supply is large as compared with the case where NPN type transistors are used.

Furthermore, as the circuit for power supply for supplying a stabilized voltage to the IC even when the input signal voltage fluctuates in the circuit for the power supply for delivering the driving input to the IC, there may be proposed such a circuit as shown in FIG. 1.

In FIG. 1, applied to between input terminals 2A and 2B through the telephone line is a DC voltage $V_L$ having superposed thereon AC signals. The input terminal 2A is set at a high potential and the input terminal 2B is set at a low potential, and the latter is connected to a reference potential point (GND).

In a former stage of this circuit for power supply, a comparator 4 is provided and which has a pair of transistors 6 and 8 with an emitter common therebetween. A constant-current source 10 for determining the driving currents of the transistors 6 and 8 is connected to a portion between the emitter and the low potential side having the input terminal 2B formed thereon, i.e. a reference potential line.

Delivered to the base of the transistor 6 are a resistance from a resistor 12 connected to a portion between a high potential line and the reference potential line and the input voltage $V_L$ from a point connected to a constant current source 14, while, supplied to the base of the transistor 8 is a reference voltage $V_B$ for comparison to an output side of this circuit.

Furthermore, a first constant-output-current circuit 16 is connected to a portion between the collector of the transistor 6 and the high potential line, while, a second constant-output-current circuit 18 is connected to a portion between the collector of the transistor 8 and the high potential line. The first constant-output-current circuit 16 comprises transistors 20, 24 and resistors 26, 28. The base and collector of the transistor 20 and the base of the transistor 24 have a common connection therebetween. The transistors 20 and 24 form a current mirror circuit and an output therefrom is delivered to a first output-voltage-stabilizing circuit 30A. On the other hand, the second constant-output-current circuit 18 comprises transistors 32 and 34 and resistors 36 and 38, the transistors 32 and 34 form a current mirror circuit similarly to the first constant-output-current circuit 16. The transistor 34 is connected to a portion between the high potential line and the reference potential line with the collector being on the reference potential side, to thereby form a bypass circuit for flowing superfluous current to the reference potential line. The transistor 24 is composed of several tens of the transistor 20 arranged in an array, and the transistor 34 is also composed of several tens of the transistors 32 arranged in an array. This is because an area of the emitter of the transistor 24 is set to be several ten times that of the transistor 20, and an area of the emitter of the transistor 34 is set to be as much as several ten times that of the transistor 32, so that a saturation current value can be increased.

Formed on the collector of the transistor 24 is an output terminal 40 for taking out a stabilized output voltage Vcc, and a capacitor 42 for absorbing fluctuating components is connected to a portion between this output terminal 40 and the reference potential point i.e. ground. Furthermore, a second output-voltage-stabilizing circuit 30B is provided between the high potential line and the reference potential line. The high potential line is formed with an output terminal 44 for taking out a stabilized output voltage $V_B$, and a capacitor 46 for absorbing fluctuating components is connected to a portion between this output terminal 44 and the reference potential point i.e. ground. The reference potential line is formed with a reference potential point terminal 48 associated with the input terminal 2B, and this reference potential point terminal 48 is connected to ground. The output voltage $V_B$ from the output-voltage-stabilizing circuit 30B is delivered to the base of the transistor 8 of the comparator 4 as a reference voltage.

As described above, in the circuit of this type when the input voltage $V_L$ as shown in FIG. 2(A) is given, the fluctuation in value thereof is more than the value $V_B$ of the voltage inverted by the operation of the comparator 4, whereby no distortion is caused to the waveform of AC signals. In FIG. 2(A), designated by $V_{LO}$ is an input voltage value saturated by the transistor 24.

Then, with the circuit for power supply as shown in FIG. 1, even when a value of the input voltage $V_L$ fluctuates and becomes lower than the voltages $V_B$ and $V_{LO}$ as hatchedly shown in FIG. 2(B), the first constant-output-current circuit 16 and the second constant-output-current circuit 18 are changed over to each other in response to an output from the comparator 4, whereby a stabilized voltage can be supplied, and moreover, the impedance is constant in value, so that no distortion is caused to the waveforms of AC signals.

However, in this circuit for power supply, the wafer area of the IC composing this circuit is disadvantageously enlarged. In other words, in this circuit for power supply, both the transistor 24 for supplying current to the first output-voltage-stabilizing circuit 30A and the transistor 34 as being the bypass circuit for flowing superfluous current to the reference potential side are arranged in arrays each consisting of several tens of PNP type transistor as shown in FIG. 3. In FIG. 3, designated at 201A, 201B and 201C are each an N layer of a PNP type transistor, and 202A and 202B are each a P layer, 204 an emitter and 205 a base. When the circuit is formed by a semiconductive integrated circuit including several PNP type transistors as described, the wafer area is disadvantageously enlarged.

SUMMARY OF THE INVENTION

An object of the present invention is to provide a circuit for power supply wherein a constant-output-current circuit for flowing to a reference potential side is changed from a PNP type transistor, to an NPN type transistor whereby the wafer area of a semiconductive integrated circuit is reduced.

To achieve the object, the circuit for power supply according to the present invention comprises: a comparator for comparing an input signal voltage, in which AC signals are superposed on a DC voltage, with a reference voltage; a first constant-output-current circuit for generating a constant-current-output in response to a non-inverted output current from this comparator; a first output-voltage-stabilizing circuit for generating a stabilized output voltage on the basis of an output current from this constant-output-current circuit; a second output-voltage-stabilizing circuit for receiving the aforesaid input signal voltage and forming the reference voltage to be supplied to the comparator; and a second constant-output-current circuit including NPN type transistor, for flowing a constant-output-current to a lower potential side in response to an inverted output from the comparator.

DETAILED DESCRIPTION OF THE PREFERRED EMBODIMENT

Figure 1:
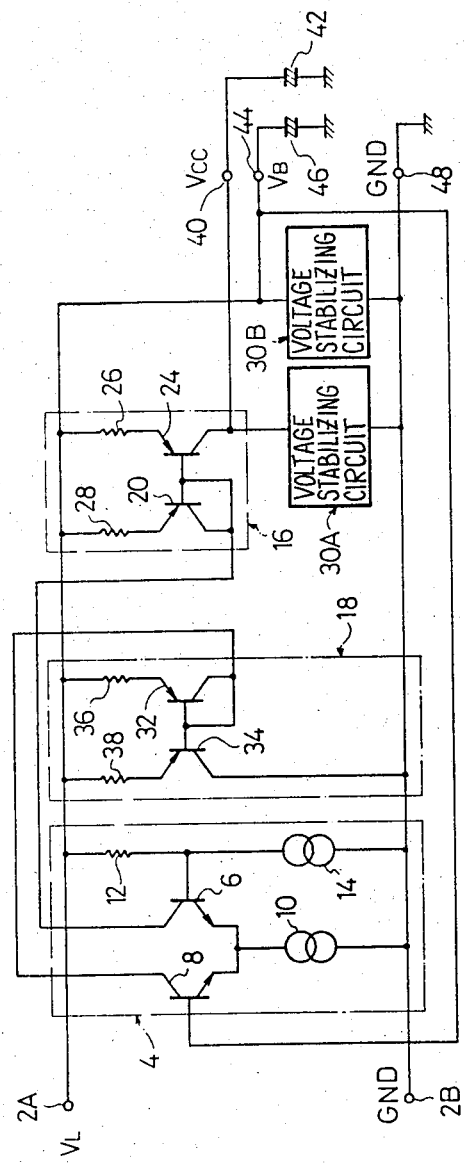
FIG. 1 is a circuit diagram showing the circuit for power supply for delivering a driving input to integrated circuit.
Figure 2A:
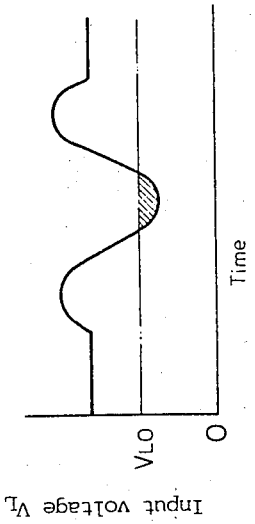
FIG. 2A and FIG. 2B are explanatory views showing the operation characteristics thereof.
Figure 2B:
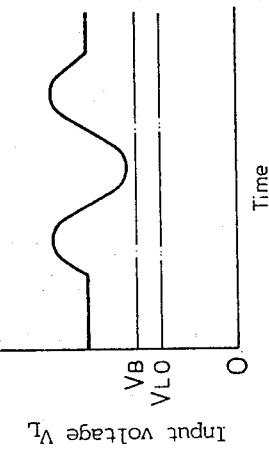

Detailed description will hereunder be given of the embodiment showing the present invention in the drawings.

Figure 7:
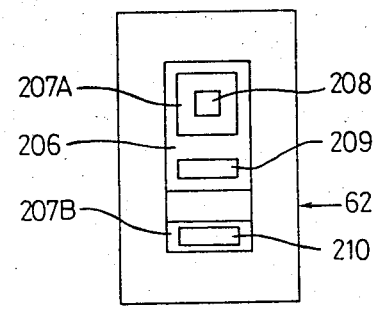
FIG. 7 is a plan view showing an NPN type transistor used in the circuit for power supply according to the present invention.
Figure 4:
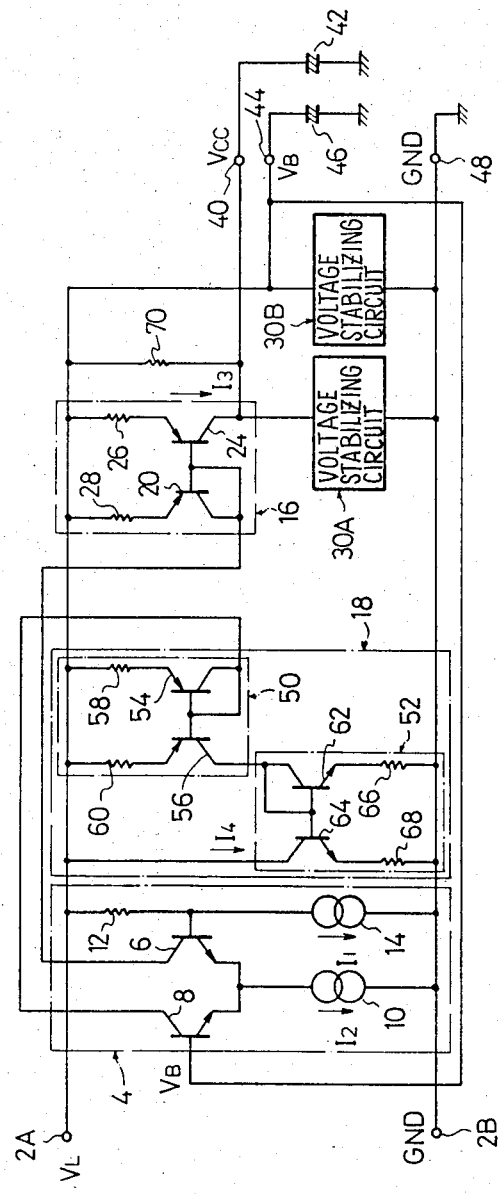
FIG. 4 is a circuit diagram showing one embodiment of a circuit for power supply according to the present invention.

FIG. 4 shows one embodiment of the circuit for power supply according to the present invention, and the same reference numerals as shown in FIG. 1 are used to designate same or similar parts. In the drawing, current mirror circuits 50 and 52 are provided in the second constant-output-current circuit 18, and, when the transistor 8 of the comparator 4 comes into the conductive state, an inverted output current from the comparator 4 is flowed to the reference potential line (the lower potential side) through the current mirror circuits 50 and 52. More specifically, the base and collector of a transistor 54 and the base of a transistor 56 have common connection, and each of resistors 58 and 60 is inserted between each emitters of the transistors 54, 56 and the higher potential line, respectively. Furthermore, the collector of the transistor 8 is connected to the base and collector of the transistor 54, and the base of the transistor 56. The collector of the transistor 56 is commonly connected to the base and collector of a transistor 62 and further connected to the base of a transistor 64. The transistors 62 are arranged in an array consisting of several tens, e.g. 50 of NPN type transistor 62 as shown in FIG. 7, to thereby form the transistor 64. This is intended for setting the area of emitters of the transistors 64 at fifty times that of the transistor 62. Each of resistors 66 and 68 are inserted between each emitters and the reference potential line, and the collector of the transistor 64 is connected to the high potential line. More specifically, the transistor 64 is provided between the high potential line and the reference potential line to form a bypass circuit for flowing superfluous current.

A resistor 70 is inserted between the collector of the transistor 24 in the first constant-output-current circuit 16 and the high potential line.

In FIG. 7, designated at 206 is a P layer in the NPN type transistor 62, and 207A and 207B are each an N layer. Denoted at 208 is an emitter of the NPN type transistor 62, 209 a base and 210 a collector.

Operation on the basis of the above-described arrangement will now be described with reference to FIG. 5. If the resistance value of the resistor 70 is set at Ro, then the impedance between the high potential line and the reference potential line is held at the resistance value Ro.

Furthermore, the comparator 4 operates as a current switch in reference to the voltage $V_B$ given to the base of the transistor 8. More specifically, if the resistance value of the resistor 12 is set at $R_1$ and the current flowing into the constant current source 14 is set at $I_1$, then the transistor 6 comes into the conductive state under a condition of $V_B < V_L - I_1 \cdot R_1$. At this time, the comparator 4 generates a noninverted output current, a constant current $I_3$ flows into the transistor 24. If the value of current flowing through the constant-current source 10 is $I_2$, then the value of this constant current $I_3$ is $50 \cdot I_2$.

Figure 5:
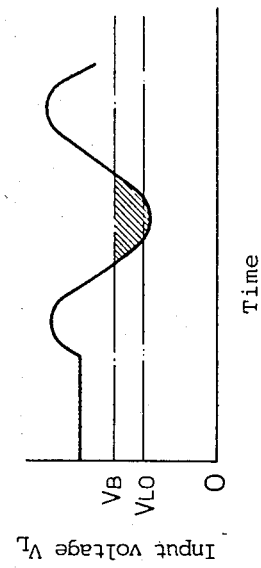
FIG. 5 is an explanatory view showing the operation characteristics thereof.

As shown in FIG. 5, when the value of the input voltage $V_L$ is decreased to reduce a voltage $V_{ce24}$ between the collector and the emitter of the transistor 24, the saturated transistor 24 cannot hold the constant-current-output, and the impedance presented between the emitter and the collector of the transistor 24 is reduced.

Here, the current $I_1$ and the resistance value $R_1$ are selected so that the value of the input voltage $V_L$ state can satisfy the condition of $V_B > V_L - I_1 \cdot R_1$ immediately before the transistor 24 is saturated. At this time, the transistor 6 moves into the nonconductive state and the transistor 8 moves into the conductive state. Under the above-described conditions, the impedance presented between the emitter and the collector of the transistor 24 is high.

When the transistor 8 is moved into the conductive state, a current $I_4$ having a value as much as fifty times that of the current $I_2$ flows into the transistor 64 in the second constant-output-current circuit 18. As the result, the current applied between the input terminals 2A and 2B is held at a constant value, the impedance presented between the input terminals 2A and 2B is held at Ro, and the distortions in waveforms in the part as hatchedly shown in FIG. 5 can be effectively suppressed.

Then, stabilized output voltages without fluctuations in voltage can be obtained at each of the output terminals 40 and 44, being suitable for driving the semiconductive integrated circuit and the like.

Figure 3:
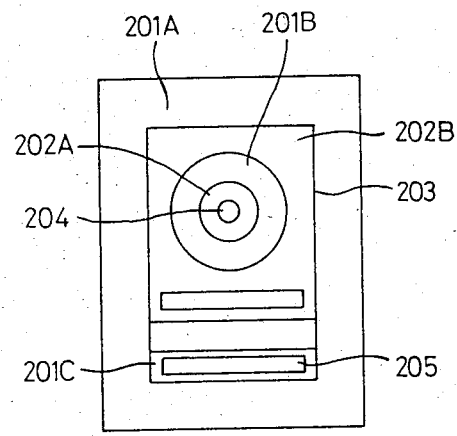
FIG. 3 is a plan view showing a PNP type transistor used in the circuit for power supply.

As apparent from the comparison between FIGS. 3 and 7, since the transistor 64 is formed of a plurality of NPN type transistors, the wafer area of tip of transistor can be extremely reduced in the case that the circuit for power supply is formed by the semiconductive integrated circuit, as compared with the circuit for power supply including a plurality of PNP type transistors are formed.

Figure 6:
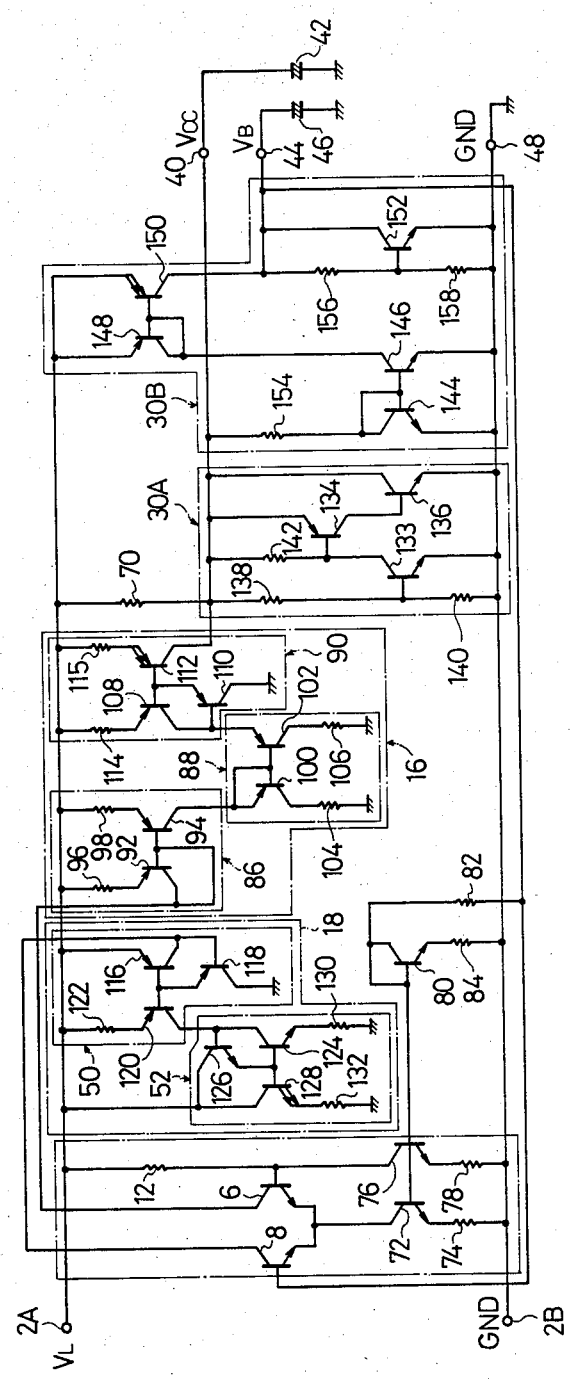
FIG. 6 is a circuit diagram showing an example of the specific circuit arrangement of the circuit for power supply according to the present invention.

FIG. 6 shows the specific circuit of the aforesaid embodiment, and same reference numerals in the circuit of the aforesaid embodiment are used to designate same or similar parts. In the drawing, the constant-output-current source 10 comprises a transistor 72 and a resistor 74, and the constant-output-current source 14 comprises the transistor 76 and the resistor 78. Each base of the transistors 72 and 76 have a common connection with the base and collector of a transistor 80, and the transistors 72, 76 and 80 form a current mirror circuit. The voltage $V_B$ is applied to the base and collector of the transistor 80 through a resistor 82, and the reference potential line is connected to the emitter of the transistor 80 via a resistor 84.

The first constant-output-current circuit 16 is provided with current mirror circuits 86, 88 and 90. The current mirror circuit 86 comprises transistors 92, 94, and resistors 96, 98. The current mirror circuit 88 comprises transistors 100, 102, and resistors 104, 106. Furthermore, the current mirror circuit 90 comprises transistors 108, 110 and 112, and resistors 114, 115. The current mirror circuit 50 in the second constant-output-current circuit 18 comprises transistors 116, 118, 120, and a resistor 122. The current mirror circuit 52 comprises transistors 124, 126 and 128, and resisters 130, 132. Each of the transistors 116, 118 and 120 is formed of a PNP type transistor. In the first and the second constant-output-current circuits 16 and 18, each of the areas of the emitters of the transistors 112 and 128 is set at a value as much as fifty times the area of each emitter of the transistors 108 and 124 associated thereto.

The first output-voltage-stabilizing circuit 30A comprises the transistors 133, 134 and 136, and the resistors 138, 140 and 142. The second output-voltage-stabilizing circuit 30B comprises the transistors 144, 146, 148, 150 and 152, and the resistors 154, 156 and 158. The transistors 144 and 146, and the resistor 154 form a current mirror circuit, and the transistors 148 and 150 also form a current mirror circuit.

With the above-described arrangement, since the transistor 128 is formed by a plurality of NPN type transistors, in the case that the circuit for power supply is formed by the semiconductive integrated circuit, the wafer area of transistor can be reduced, and the manufacturing cost can be reduced, and the impedance between the input terminals 2A and 2B can be held at a resistance value substantially equal to the resistance value Ro of the resistor 70, and the adjustment of the impedance can be free.

Moreover, the dynamic range of the signal voltage applied between the input terminals 2A and 2B can be enlarged. In consequence, the above-described power supply can provide a stabilized output voltage superposed thereon with AC signals, and can be used in the power source means for an electronic component other than the telephone set, etc.

As has been described hereinabove, according to the present invention, the transistors in the constant-output-current circuit for flowing superfluous current to the reference potential point side are changed from PNP type transistors to NPN type transistors, so that the wafer area of the semiconductive integrated circuit can be reduced and the dynamic in response to the input signal voltages can be enlarged.

What is claimed is:
1. A circuit for power supply, comprising:
   a comparator circuit means for comparing an input signal voltage, in which alternating current signals are superposed on a direct current voltage, with a reference voltage and producing a non-inverted signal when said input signal has a fluctuation less than said reference voltage and an inverted signal when said input signal has a fluctuation more than said reference voltage;
   a first constant-output-cuurent circuit means for generating a constant-output-current in response to a non-inverted output current from said comparator circuit means;
   a first output-voltage-stabilizing circuit means for generating a stabilized output voltage in response to an output from said first constant-output-current circuit means;
   a second output-voltage-stabilizing circuit means for receiving said input signal voltage and generating said reference voltage; and
   a second constant-output-current circuit means including a first current mirror circuit means driven in response to an inverted output current from said comparator circuit means and a second current mirror circuit means driven by an output from said first current mirror circuit means and having NPN type transistors for flowing a superfluous current to a low potential line, said NPN type transistors each being connected at the collector thereof to a high potential line and at the emitter thereof to said low potential line.

* * * * *